US012766417B2

(12) United States Patent
Wang et al.

(10) Patent No.: US 12,766,417 B2
(45) Date of Patent: Oct. 20, 2026

(54) REAL TIME TRANSLATION METHOD FOR GAMES USING MACHINE LEARNING MODEL

(71) Applicants: Shih-Pang Wang, New Taipei City (TW); Guan-Lin Chen, Taichung City (TW)

(72) Inventors: Shih-Pang Wang, New Taipei City (TW); Guan-Lin Chen, Taichung City (TW)

( * ) Notice: Subject to any disclaimer, the term of this patent is extended or adjusted under 35 U.S.C. 154(b) by 251 days.

(21) Appl. No.: 18/736,546

(22) Filed: Jun. 7, 2024

(65) Prior Publication Data

US 2025/0375710 A1 Dec. 11, 2025

(51) Int. Cl.

| | |
|---|---|
| ***A63F 13/67*** | (2014.01) |
| ***A63F 13/52*** | (2014.01) |
| ***G06F 40/58*** | (2020.01) |
| ***G06V 20/40*** | (2022.01) |
| ***G06V 30/19*** | (2022.01) |

(52) U.S. Cl.

CPC .............. *A63F 13/67* (2014.09); *A63F 13/52* (2014.09); *G06F 40/58* (2020.01); *G06V 20/46* (2022.01); *G06V 30/19147* (2022.01)

(58) Field of Classification Search

CPC .......... A63F 13/67; A63F 13/52; G06F 40/58; G06V 20/46; G06V 30/19147

USPC .......................................................... 463/31

See application file for complete search history.

(56) References Cited

U.S. PATENT DOCUMENTS

| | | | | |
|---|---|---|---|---|
| 12,217,017 | B2 * | 2/2025 | Jain | G06F 40/58 |
| 12,499,332 | B2 * | 12/2025 | Panda | G06F 40/58 |
| 2023/0267285 | A1 * | 8/2023 | Wu | G06F 40/166 704/2 |
| 2023/0376699 | A1 * | 11/2023 | Barbello | G06F 40/58 |

FOREIGN PATENT DOCUMENTS

| | | | | |
|---|---|---|---|---|
| CN | 112183122 A * | 1/2021 | | G06V 20/10 |
| TW | I795081 B | 3/2023 | | |

OTHER PUBLICATIONS

Machine translation of CN-112183122-A (Year: 2021).*

* cited by examiner

*Primary Examiner* — Allen Chan

(74) *Attorney, Agent, or Firm* — Winston Hsu

(57) ABSTRACT

A real time translation method for a game includes extracting features from video frames using computer vision and a database, performing an association process to find a machine learning model best matching the features for translation, obtaining texts in the game through optical character recognition (OCR), preprocessing the texts, translating the texts using the machine learning model to generate translated texts, and rendering the translated texts to images of the video frames for displaying the images with the translated texts on a display device.

14 Claims, 6 Drawing Sheets

REAL TIME TRANSLATION METHOD FOR GAMES USING MACHINE LEARNING MODEL

BACKGROUND OF THE INVENTION

1. Field of the Invention

The present invention is related to a real time translation method, in particular, related to a real time translation method for games using machine learning model.

2. Description of the Prior Art

A large language model (LLM) is an artificial intelligence system that has been trained on a vast dataset, often consisting of billions of words taken from books, the web, and other sources. LLMs are designed to generate human-like, contextually relevant responses to queries.

LLMs are built on machine learning, specifically using a type of neural network called a transformer model. These models analyze massive data sets of language, which is why they are referred to as "large." The data used for training often comes from the Internet, comprising thousands or millions of gigabytes' worth of text.

LLMs learn to recognize and interpret human language or other complex data. They use a type of machine learning called deep learning, which involves probabilistic analysis of unstructured material. Deep learning enables LLMs to understand how characters, words, and sentences function together.

After initial training, LLMs are further adjusted through a process called fine-tuning. Fine-tuning tailors the model to specific tasks that programmers want it to perform, such as answering questions, generating responses, or translating text. For example, publicly available LLMs like ChatGPT can generate essays, poems, and other textual forms in response to user inputs.

LLMs are versatile with a wide range of applications, such as:

- Generative AI: LLMs can generate text when provided with a prompt or question;
- Code Writing: Certain LLMs aid programmers by writing code or completing programs;
- Sentiment Analysis;
- DNA Research;
- Customer Service; and
- Chatbots.

Thus, LLMs are powerful tools for understanding and generating human language, and their adaptability makes them valuable across different domains.

A transformer model is a type of neural network architecture that has revolutionized natural language processing (NLP). Unlike traditional recurrent neural networks (RNNs) or convolutional neural networks (CNNs), transformers rely on a mechanism called self-attention. Self-attention allows a model to weigh the importance of different parts of an input sequence when making predictions.

Given an input sequence (e.g., a sentence), the model computes attention scores for each position in the sequence. These scores determine how much attention the model should pay to each position when processing other positions. The attention mechanism allows the model to focus on relevant context, even for long sequences. Importantly, self-attention considers all positions simultaneously, making it highly parallelizable.

Transformer models excel at capturing context, which is crucial for understanding human language. Context is context-dependent, meaning the meaning of a word or phrase often depends on surrounding words. By using self-attention, transformers can understand how different parts of a sentence relate to each other, grasp the connections between the beginning and end of a sentence, and comprehend how sentences within a paragraph or document are interconnected. This context-awareness enables LLMs to interpret ambiguous or novel language constructs.

LLMs learn semantics by observing countless examples of word combinations and their meanings. When encountering new phrases or contexts, they draw upon this learned knowledge. If they've seen "apple" and "pie" together frequently, they understand the concept of "apple pie." When faced with a novel phrase like "blueberry pizza," they can infer its meaning based on the compositionality of words. This ability to connect words and concepts through meaning is a hallmark of LLMs.

In summary, transformer models, with their self-attention mechanism, empower LLMs to understand context, handle ambiguity, and interpret human languages effectively. They're like language chameleons, adapting to various linguistic contexts.

Retrieval augmented generation (RAG) enhances the capabilities of large language models (LLMs) by incorporating external knowledge from authoritative sources. LLMs are AI systems trained on extensive datasets, often containing billions of words. They use complex neural network architectures with billions of parameters to generate raw output for various tasks, such as answering questions, translating languages, and completing sentences.

RAG extends LLMs by allowing them to consult external knowledge bases beyond their original training data. Instead of relying solely on their internal knowledge, RAG-equipped LLMs can access authoritative information from external sources. This process occurs before generating a response, ensuring that the output is well-informed and contextually relevant.

RAG enables LLMs to tap into domain-specific or organization-specific knowledge. Unlike retraining the entire LLM, RAG integrates external knowledge without the need for extensive model updates. Organizations can improve LLM performance without investing in a new training cycle. By incorporating external data, RAG helps LLMs remain relevant, accurate, and useful across various scenarios.

In summary, RAG empowers LLMs to leverage external knowledge, making them even more effective in providing informed responses. It's like giving an AI a well-stocked library to enhance its language abilities.

However, applying LLM and RAG on real time translation for games suffers from three problems. The first problem is that if the game text is generated by optical character recognition (OCR), the game text will gradually appear line by line as the game progresses. Because real time translation must consider immediacy, the LLM and RAG service must be frequently called in implementation. If the translation result is expected to have memory and context, each prompt must include the previous cache. In addition to the rapid increase in the cost of calling the model, the input data length of the LLM is limited and cannot consider longer-term memory.

Secondly, in order to make the model more accurate for real-time translation of game text, the RAG architecture is a common approach for those familiar with AI technology. However, although RAG improves accuracy, it also increases the cost of calling the LLM.

Thirdly, in addition to RAG, fine-tune is also a common method by those familiar with AI technology. The method can increase accuracy by fine-tuning the base model and reduce the cost of calling the model compared with RAG. However, in terms of real-time translation of game text, fine-tuning would be unrealistic to use all materials for the LLM due to the huge amount of game text and the numerous games.

SUMMARY OF THE INVENTION

An embodiment provides a real time translation method for a game. The method includes extracting features from video frames using computer vision and a database, performing an association process to find a machine learning model best matching the features for translation, obtaining texts in the game through optical character recognition (OCR), preprocessing the texts, translating the texts using the machine learning model to generate translated texts, and rendering the translated texts to images of the video frames for displaying the images with the translated texts on a display device.

Another embodiment provides a real time translation method for a game. The method includes extracting features from video frames using computer vision and a database, performing an association process to find weightings of N machine learning models best matching the features for translation, obtaining texts in the game through optical character recognition (OCR), preprocessing the texts, translating the texts using the N machine learning models with the weightings to generate translated texts, and rendering the translated texts to images of the video frames for displaying the images with the translated texts on a display device.

These and other objectives of the present invention will no doubt become obvious to those of ordinary skill in the art after reading the following detailed description of the preferred embodiment that is illustrated in the various figures and drawings.

DETAILED DESCRIPTION

Cross-language translation and localization have always been issues that developers and publishers must face to promote their products globally. Taking books as an example, people invented translation pens and electronic dictionaries to solve translation problems. In the realm of e-books, translation can even be done efficiently through various plug-ins and translation engines.

Regrettably, the market lacks effective solutions for text-related issues experienced during gameplay. The practice of typing a query word-for-word is clearly unfeasible. Often, players find themselves with no alternative but to adjust to these circumstances, thereby compromising a portion of their gaming experience. There is a persistent demand from users for publishers and developers to release versions in languages they are comfortable with. Using Nintendo® platform games as an example, the number of games supporting English is four times greater than those supporting Chinese. This is noteworthy considering that the population base for Chinese speakers is larger.

The present invention integrates advanced artificial intelligence (AI) technology for the utilization of game text. The embodiment discloses a method for real-time translation and display of game text. By designing an efficient information process, it provides real-time translation services for game text without compromising the gaming experience of the players. Furthermore, this invention enhances the feasibility of technology commercialization and profitability in terms of cost, benefit, and legality.

Figure 1:
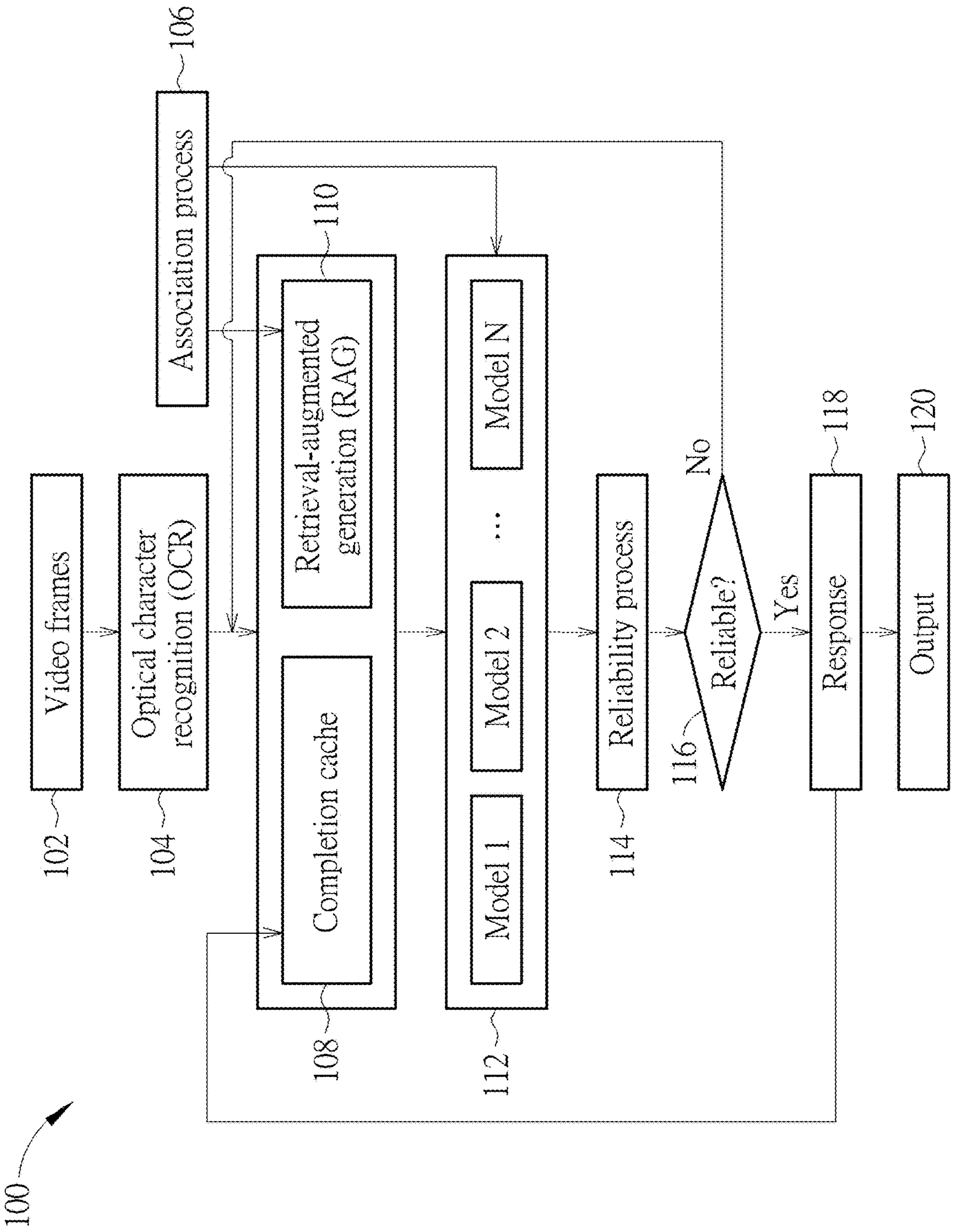
FIG. 1 is a flowchart of a real time translation method for a game using machine learning model according to an embodiment of the present invention.

FIG. 1 is a flowchart of a real time translation method 100 for a game using machine learning model according to an embodiment of the present invention. Video frames 102 are provided from the game and optical character recognition 104 is performed on the video frames 102 to transform images in the video frames 102 into texts. Optical character recognition (OCR) 104 is a technology that uses automated data extraction to quickly convert images of text into a machine-readable format. For instance, when a form or a receipt is scanned, the computer saves the scan as an image file. However, the image file cannot be directly edited, searched, or counted in the image file using a text editor. OCR 104 is performed to convert the image into a text document, making the contents accessible and editable.

By inputting the text transformed from OCR 104, retrieval-augmented generation (RAG) 110 is performed to enable the large language model (LLM) to search relevant data from sources such as websites, databases or other external sources. Retrieval-augmented generation (RAG) 110 is a method that bolsters the precision and dependability of generative AI models. It achieves this by integrating information gathered from external sources.

Large language models (LLMs) have the capability to produce text that mimics human-like writing, based on provided prompts. These models acquire patterns from extensive volumes of text data during their training phase. Similar to neural networks, LLMs depend on parameters they've learned to generate text. These parameters encapsulate broad language patterns but do not possess specific knowledge about factual real-world information or recent occurrences. Although LLMs are proficient at responding to general prompts, they encounter difficulties when users request more specific or current information. For example, if a user inquires about the most recent scientific advancements or current affairs, an LLM might offer generic responses rooted in its training data, rather than incorporating new and relevant facts.

RAG 110 bridges this gap by combining retrieval and generation. RAG 110 first retrieves relevant information from external sources (such as databases, websites, or documents). Then, RAG 110 uses this retrieved content to enhance its generated response. The model can incorporate factual details, making its output more accurate and context-aware. RAG 110 can provide precise answers by pulling in facts from reliable sources. RAG 110 can generate informative articles, summaries, or reports by blending retrieved information with its own creativity. RAG 110 enables more informed and contextually relevant interactions. In summary, RAG 110 combines the strengths of both retrieval and generation, allowing AI models to provide more accurate and specific responses. RAG 110 is a powerful tool for bridging the gap between general language understanding and real-world knowledge.

In FIG. 1, RAG 110 provides related information from searching external sources, and an association process 106 is performed on RAG 110 and translation machine learning models 112 to generate the machine learning model best matching the features in video frames 102. Association Process 106 refers to a trained machine learning model or agent that excels in a specific task: matching game images to pre-trained machine learning models.

Association Process 106 can be built using various architectures, including fully connected networks, convolutional neural networks (CNNs), and/or transformers. Fully connected networks connect all neurons in one layer to every neuron in the next layer. They are versatile and can handle various tasks. CNNs specialize in processing grid-like data, such as images. They use convolutional layers to extract features hierarchically. Transformers, known for their attention mechanisms, excel in sequence-to-sequence tasks and have revolutionized natural language processing (NLP).

Association process 106 focuses on matching game images to pre-trained machine learning models. The association process 106 considers both operational performance and model training costs. Image features are obtained through machine vision-based feature extraction algorithms. Examples include native image resolution, brush strokes, user interface (UI) element layout, and interaction patterns. Classification labels come from external or internal databases. They provide context and help the model understand the semantics of the images. To enhance accuracy, Association Process 106 combines features with human-labeled data. Large language models (LLMs) boost this process by providing context-aware labels. The association process 106 collaborates with the front-end pipeline, which handles image input and preprocessing. Association process 106 proposes an architecture that integrates recognition and classification tasks with NLP. It bridges the gap between visual understanding and language comprehension. In summary, association process 106 leverages machine vision features, classification labels, and LLM-enhanced data to excel in matching game images. The innovative architecture of the association process 106 makes it a powerful tool for combining visual and textual information.

N machine learning models 112 are pre-trained for translating the game text into another language in different scenarios. The association process 106 helps to find a machine learning model best matching the features of the video frames 102. The machine learning model can thus be used to translate the game text in real time. In another embodiment, the association process 106 generates N weightings of N machine learning models 112 best matching the features of the video frames 102. These N weightings represent the relationship between the translation machine learning models 112 and the video frames 102. The larger the weighting is, the closer the relationship is. By applying the N weightings on the corresponding N machine learning models 112, the N machine learning models 112 can generate a final answer for translation of the game text.

The final answer is then inputted into a reliability process to check the reliability of the translated game texts. The reliability process can reject the translated game texts if the translated game texts are hurtful, age mismatching and/or related to other unreliable situation. If the translated game texts are unreliable, then the process goes to the steps after OCR 104 again, that is, loading context from RAG 110 and completion cache 108. If the translated game texts are reliable, then the response 118 is generated and provided to the completion cache 108 and outputted 120 to a display device.

Figure 2:
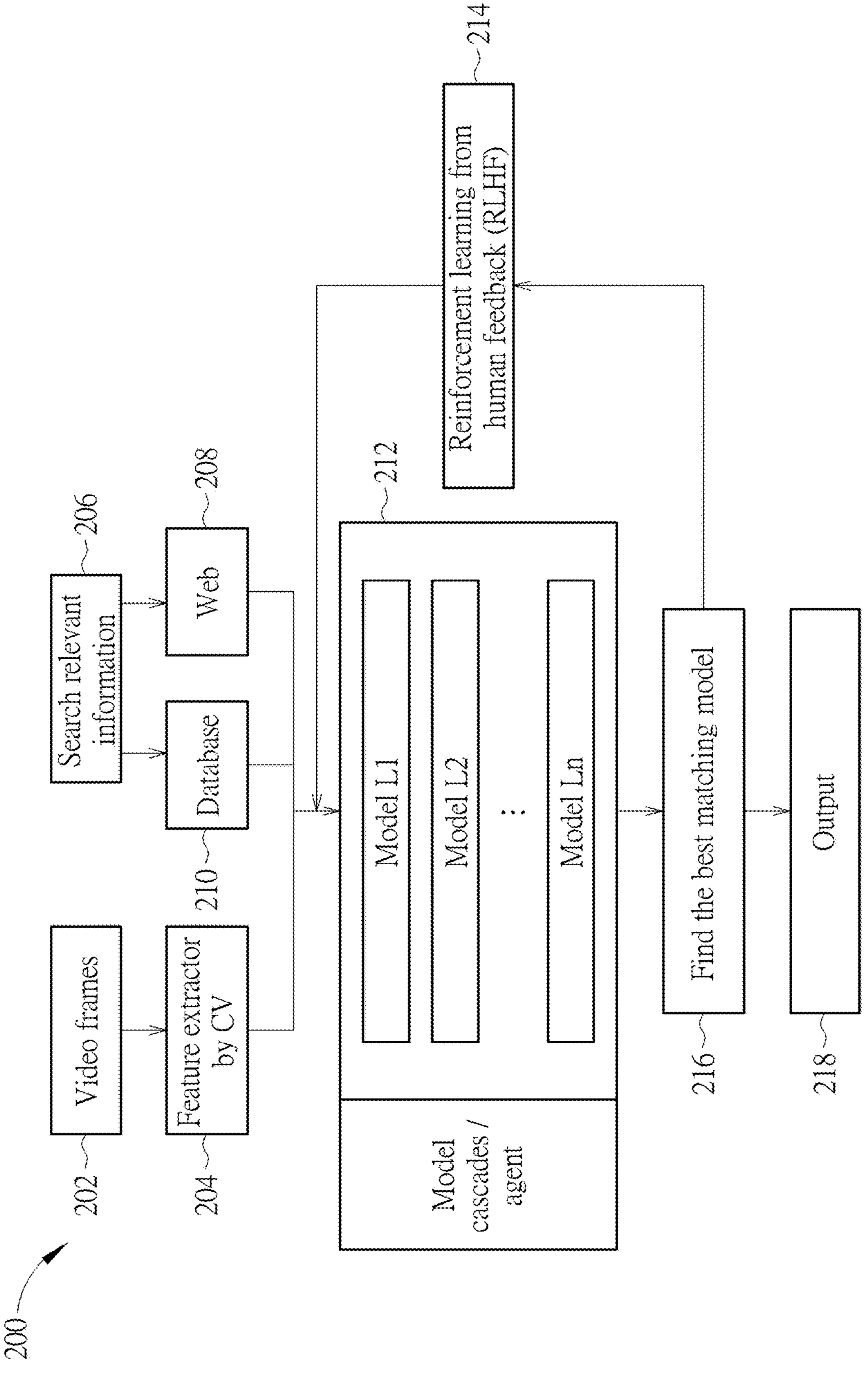
FIG. 2 is a flowchart of a training method of the association process according to an embodiment of the present invention.

FIG. 2 is a flowchart of a training method 200 of the association process 106 according to an embodiment of the present invention. Video frames 202 are provided from the game and the features of the video frames 202 are extracted by a feature extractor 204 using computer vision techniques. The features of the video frames 202 include but not limited to image resolution, frame per second (FPS), layout, UI element and/or image recognition description. Relevant information 206 is searched in a database 210 and/or a website 208 using RAG 110 techniques. The features of the video frames 202 and the relevant information 206 are fed into L1, L2, to Ln machine learning models 212 for finding the best translation model. Then, a machine learning model best matching the features of the video frames 202 of the N machine learning models 112 is labeled by human feedback 214, thus generating a best matching model 216. By iteratively applying reinforcement learning with human feedback 214, the machine learning models 212 of the association process 106 can be trained and used in inference.

Figure 3:
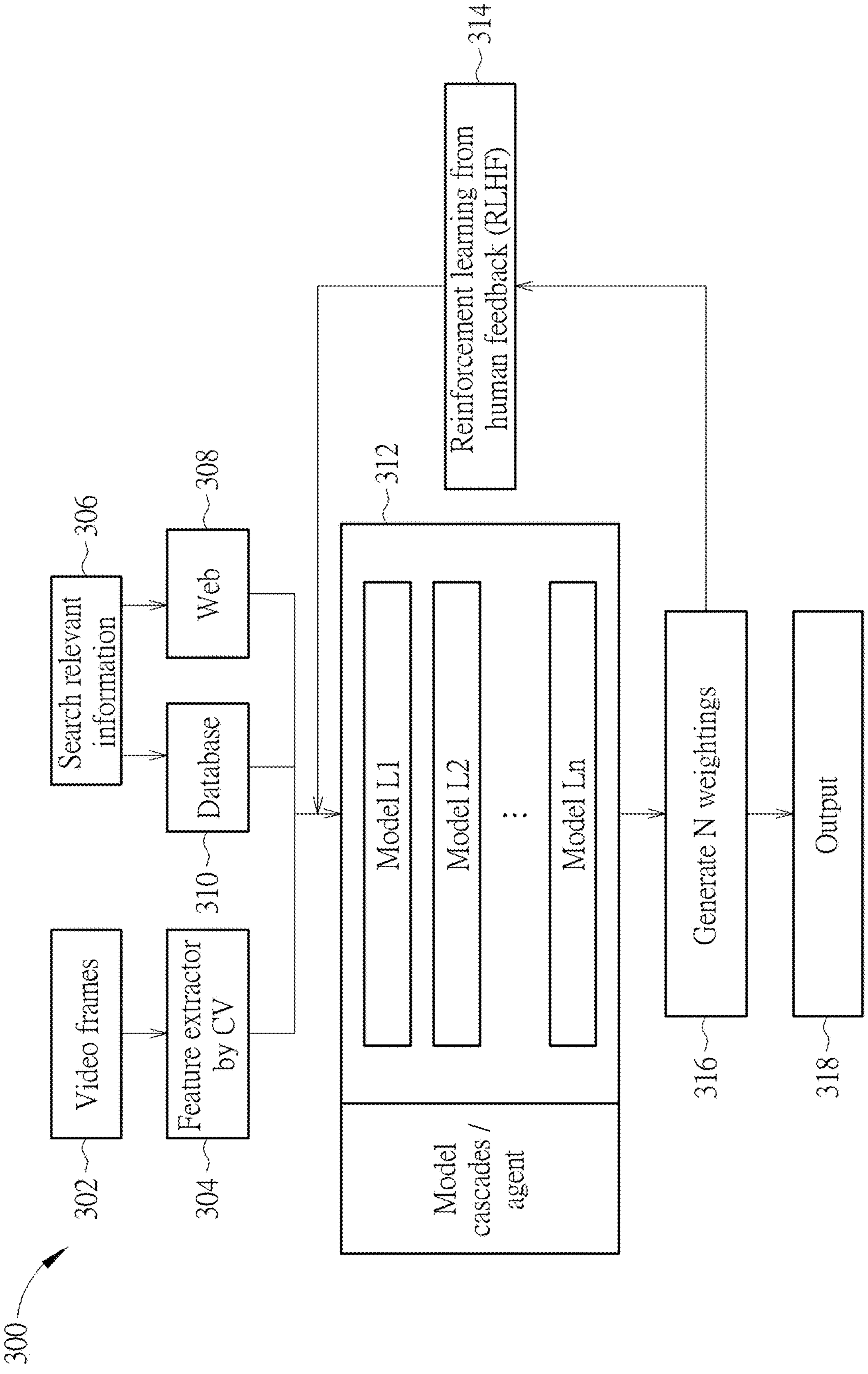
FIG. 3 is a flowchart of a training method of the association process according to another embodiment of the present invention.

FIG. 3 is a flowchart of a training method 300 of the association process 106 according to another embodiment of the present invention. Video frames 302 are provided from the game and the features of the video frames 302 are extracted by a feature extractor 304 using computer vision techniques. The features of the video frames 302 include but not limited to image resolution, frame per second (FPS), UI element layout, and/or image recognition description. Relevant information 306 is searched in a database 310 and/or a website 308 using RAG 110 techniques. The features of the video frames 302 and the relevant information 306 are fed into L1 to Ln machine learning models 312 for finding the N weightings of the N translation models. Then, N weightings of the N machine learning models matching the features of the video frames 302 of the N machine learning models 112 are labeled by human feedback 314, thus generating N weightings 316. By iteratively applying reinforcement learning with human feedback 314, the machine learning models 312 of the association process 106 can be trained and used in inference.

Figure 4:
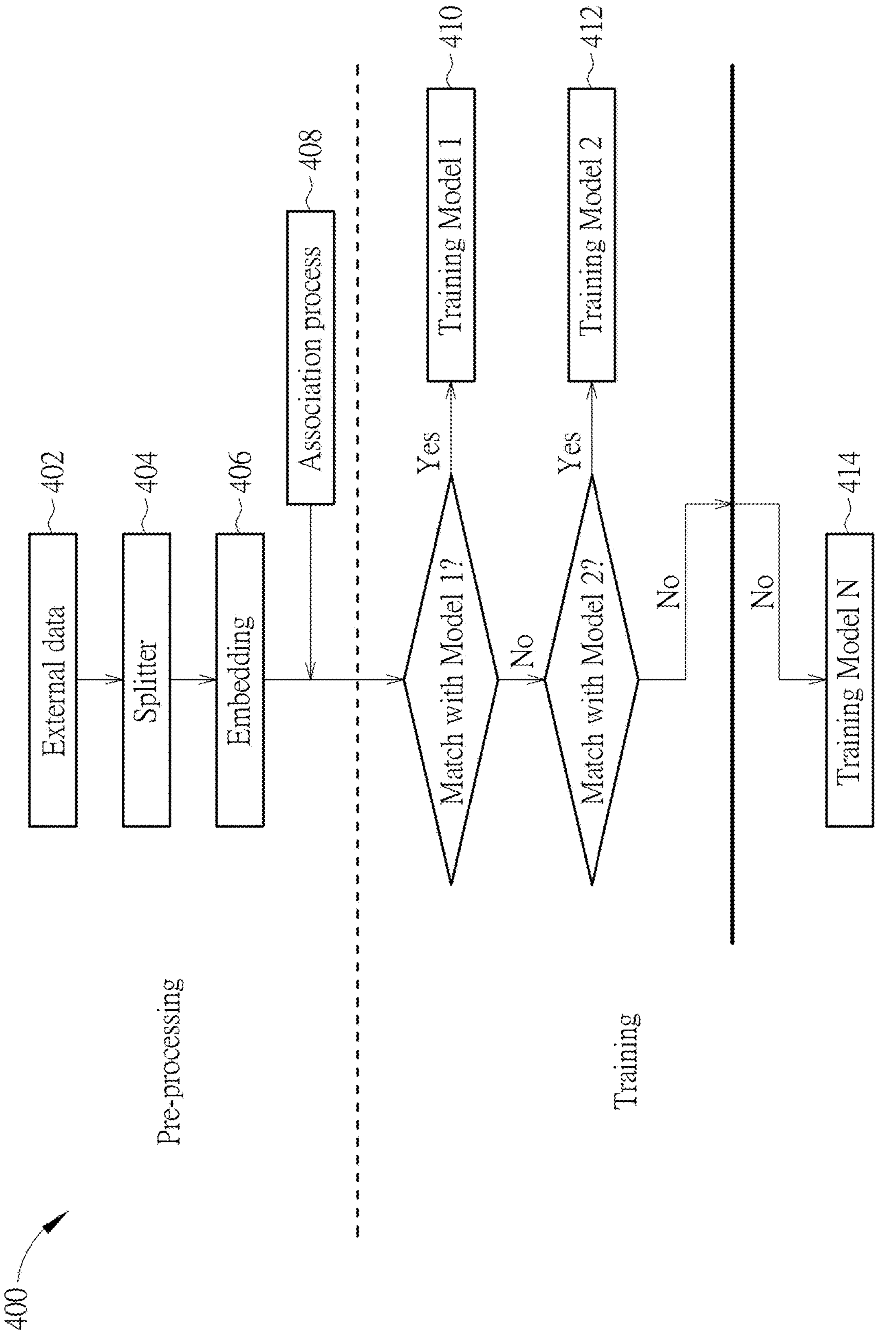
FIG. 4 is a flowchart of a training process for N translation machine learning models according to an embodiment of the present invention.

FIG. 4 is a flowchart of a training process 400 for N translation machine learning models according to an embodiment of the present invention. After the association process 408 is trained, the N translation machine learning models can be trained. The external training data 402 are provided and preprocessed using splitter 404 and embedding 406. Then, the preprocessed training data are inputted to an association process 408. The association process 408 finds the machine learning model best matching the features of the video frames 202. If the machine learning model best matching the features of the video frames 202 is model 1, then model 1 410 is trained using the training data. If the machine learning model best matching the features of the video frames 202 is model 2 412, then model 2 412 is trained using the training data. If the machine learning model best matching the features of the video frames 202 is model N 414, then model N 414 is trained using the training data. With the aid of the association process, the N translation machine learning models can be trained properly.

Figure 5:
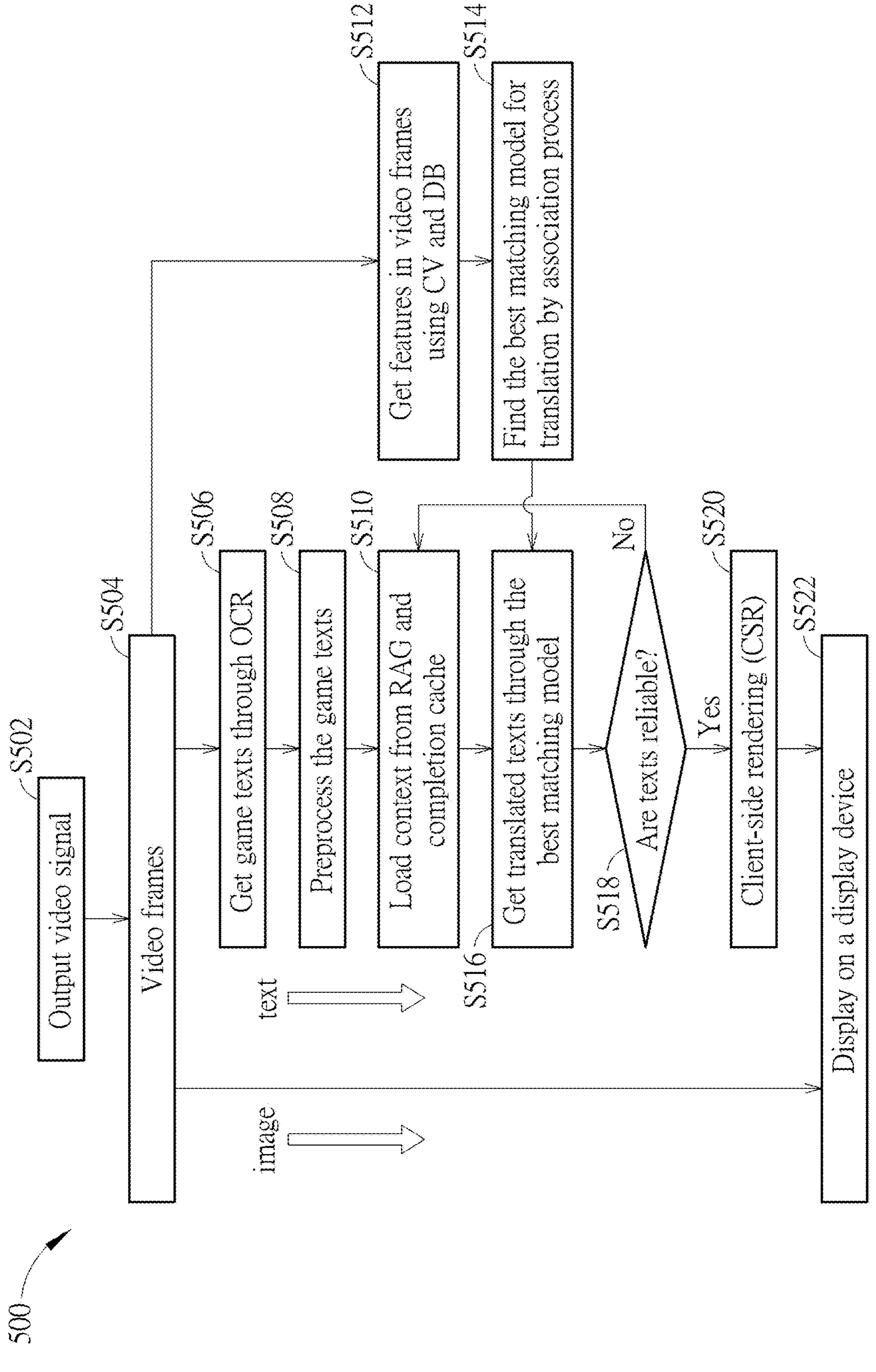
FIG. 5 is a flowchart of a real time translation method for a game using machine learning models according to an embodiment of the present invention.

FIG. 5 is a flowchart of a real time translation method 500 for a game using machine learning models according to an embodiment of the present invention. The real time translation method 500 includes the following steps:

Step S502: output a video signal from a game;

Step S504: obtain video frames from the video signal; go to steps S506, S512 and S522;

Step S506: obtain game texts through OCR;

Step S508: preprocess the game texts;

Step S510: load context from RAG and completion cache; go to step S516;

Step S512: obtain features in video frames using computer vision techniques and a database;

Step S514: find the machine learning model best matching the features for translation by association process;

Step S516: obtain translated texts through the machine learning model best matching the features;

Step S518: check if the translated texts are reliable; if so, go to step S520; else go to step S510;

Step S520: client-side renders the image with the translated texts; and

Step S522: display the translated texts with the image on a display device.

In step S502, a game outputs a video signal to be translated. In step S504, video frames are obtained from the video output signal. Go to steps S506, S512, and S522. In step S506 the game texts are obtained through applying OCR on the video frames. In step S508, the game texts are preprocessed. In an embodiment, the game texts are preprocessed using embedding, text splitting, clustering, map reducing, and/or refining. In step S510, context is loaded from RAG and completion cache. Go to step S516. In step S512, the features are extracted from the video frames using computer vision techniques and a database. In step S514, find the machine learning model best matching the extracted features for translation using the association process. In step S516, the game texts are translated into translated texts using the machine learning model best matching the features. In step S518, if the translated texts are not reliable, go back to step S510. If the translated texts are reliable, go to step S520. In step S520, the image of the video frames can be rendered with the translated texts. In step S522, the translated texts with the image can be displayed on a display device.

Figure 6:
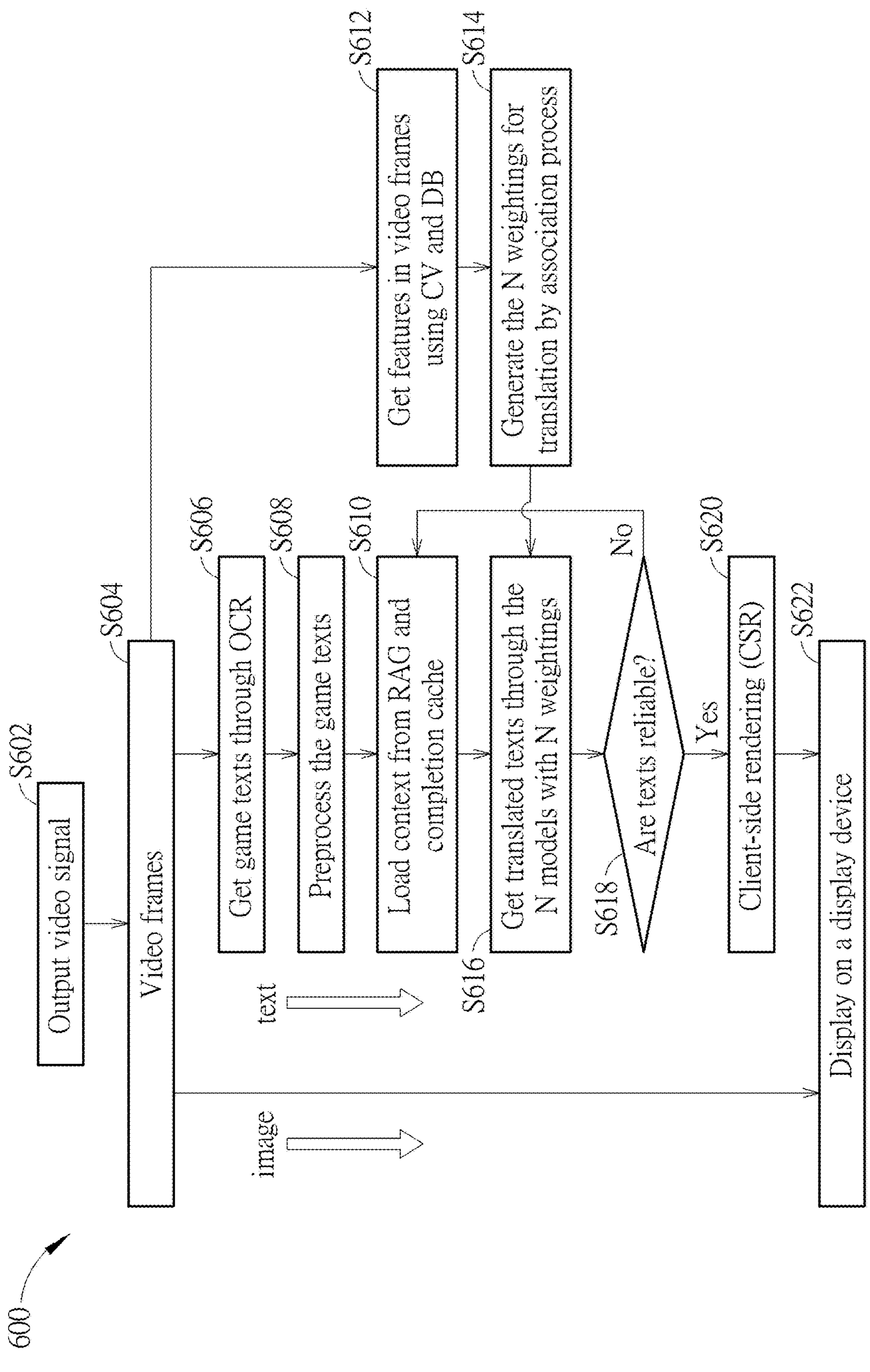
FIG. 6 is a flowchart of a real time translation method for a game using machine learning models according to another embodiment of the present invention.

FIG. 6 is a flowchart of a real time translation method 600 for a game using machine learning models according to another embodiment of the present invention. The real time translation method 600 includes the following steps:

Step S602: output a video signal from a game;

Step S604: obtain video frames from the video signal; go to steps S606, S612 and S622;

Step S606: obtain game texts through OCR;

Step S608: preprocess the game texts;

Step S610: load context from RAG and completion cache; go to step S616;

Step S612: obtain features in video frames using computer vision techniques and a database;

Step S614: find the N weightings of the N machine learning models matching the features for translation by association process;

Step S616: obtain translated texts through the N machine learning models with N weightings;

Step S618: check if the translated texts are reliable; if so, go to step S620; else go to step S610;

Step S620: client-side renders the image with the translated texts; and

Step S622: display the translated texts with the image on a display device.

In step S602, a game outputs a video signal to be translated. In step S604, video frames are obtained from the video output signal. Go to steps S606, S612, and S622. In step S606 the game texts are obtained through applying OCR on the video frames. In step S608, the game texts are preprocessed. In an embodiment, the game texts are preprocessed using embedding, text splitting, clustering, map reducing, and/or refining. In step S610, context is loaded from RAG and completion cache. Go to step S616. In step S612, the features are extracted from the video frames using computer vision techniques and a database. In step S614, find the N weightings of the N machine learning models matching the extracted features for translation using the association process. In step S616, the game texts are translated into translated texts using the N weightings with the N machine learning models. In step S618, if the translated texts are not reliable, go back to step S610. If the translated texts are reliable, go to step S620. In step S620, the image of the video frames can be rendered with the translated texts. In step S622, the translated texts with the image can be displayed on a display device.

In an embodiment, the video output device such as a game console, the real-time translation device, and the display device such as a television are independent devices. The whole process of the present invention can be performed in the real-time translation device. In another embodiment, the real-time translation device and the display device are the same device such as a personal computer (PC), a smartphone, and other devices. In another embodiment, the video output device, real-time translation device, and the display device are the same device such as a PC, a smartphone, a game console, a tablet, and other devices. In another embodiment, the video output device and the real-time translation device are the same device such as a stand-alone terminal device with translation function.

In conclusion, a real time translation method for a game using machine learning model and association process is proposed. The present invention provides real-time translation of game text services without affecting players' experience of the game. The present invention also improves the feasibility (cost, benefit, legality) of technology commercialization and profit compared to the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A real time translation method for a game, comprising:

extracting features from video frames using computer vision and a database;

performing an association process to find a machine learning model best matching the features for translation;

obtaining texts in the game through optical character recognition (OCR);

preprocessing the texts;

after preprocessing the texts, loading contexts from retrieval-augmented generation (RAG) and completion cache;

translating the texts using the machine learning model to generate translated texts; and rendering the translated texts to images of the video frames for displaying the images with the translated texts on a display device.

2. The method in claim 1, further comprising:
if the translated texts are not reliable, loading contexts from the retrieval-augmented generation (RAG) and the completion cache again.

3. The method in claim 1, wherein rendering the translated texts to the images of the video frames for displaying the images with the translated texts on the display device is performed if the translated texts are reliable.

4. The method in claim 1, wherein preprocessing the texts comprises embedding, text splitting, clustering, map reducing, and/or refining the texts.

5. The method in claim 1, wherein performing the association process to find the machine learning model best matching the features for translation comprises:
selecting the machine learning model best matching the features from N machine learning models;
wherein N is a positive integer.

6. The method in claim 5, further comprising:
training the N machine learning models.

7. A real time translation method for a game, comprising:
extracting features from video frames using computer vision and a database;
training N machine learning models;
selecting a machine learning model best matching the features from the N machine learning models by performing an association process, wherein N is a positive integer;
obtaining texts in the game through optical character recognition (OCR);
preprocessing the texts;
translating the texts using the machine learning model to generate translated texts; and
rendering the translated texts to images of the video frames for displaying the images with the translated texts on a display device;
wherein training the N machine learning models comprises:
preprocessing training texts;
performing another association process to find a machine learning model best matching features of training images containing the training texts from the N machine learning models; and
training the machine learning model best matching the features of the training images with the training texts and answers.

8. The method in claim 7, wherein preprocessing the training texts comprises embedding, text splitting, clustering, map reducing, and/or refining the training texts.

9. A real time translation method for a game, comprising:
extracting features from video frames using computer vision and a database;
performing an association process to find weightings of N machine learning models best matching the features for translation;
obtaining texts in the game through optical character recognition (OCR);
preprocessing the texts;
after preprocessing the texts, loading contexts from retrieval-augmented generation (RAG) and completion cache;
translating the texts using the N machine learning models with the weightings to generate translated texts; and
rendering the translated texts to images of the video frames for displaying the images with the translated texts on a display device.

10. The method in claim 9, further comprising:
if the translated texts are not reliable, loading contexts from the retrieval-augmented generation (RAG) and the completion cache again.

11. The method in claim 9, wherein rendering the translated texts to the images of the video frames for displaying the images with the translated texts on the display device is performed if the translated texts are reliable.

12. The method in claim 9, wherein preprocessing the texts comprises embedding, text splitting, clustering, map reducing, and/or refining the texts.

13. The method in claim 9, further comprising:
training the N machine learning models.

14. A real time translation method for a game, comprising:
extracting features from video frames using computer vision and a database;
training N machine learning models;
performing an association process to find weightings of the N machine learning models best matching the features for translation, wherein N is a positive integer;
obtaining texts in the game through optical character recognition (OCR);
preprocessing the texts;
translating the texts using the N machine learning models with the weightings to generate translated texts; and
rendering the translated texts to images of the video frames for displaying the images with the translated texts on a display device;
wherein training the N machine learning models comprises:
preprocessing training texts;
performing another association process to find a machine learning model best matching features of training images containing the training texts from the N machine learning models; and
training the machine learning model best matching the features of the training images with the training texts and answers.

* * * * *